(12) United States Patent
Brown (10) Patent No.: US 6,564,546 B2
(45) Date of Patent: May 20, 2003

(54) VARIABLE STALL CONTROL

(75) Inventor: Fred Brown, Copiague, NY (US)

(73) Assignee: FB Performance Transmission Inc., Bay Shore, NY (US)

( * ) Notice: Subject to any disclaimer, the term of this patent is extended or adjusted under 35 U.S.C. 154(b) by 50 days.

(21) Appl. No.: 09/820,160

(22) Filed: Mar. 27, 2001

(65) Prior Publication Data

US 2001/0035010 A1 Nov. 1, 2001

Related U.S. Application Data

(60) Provisional application No. 60/196,129, filed on Apr. 11, 2000.

(51) Int. Cl.$^7$ ............................................. F16D 33/06
(52) U.S. Cl. ..................... 60/357; 137/312; 137/625.64
(58) Field of Search ........................... 60/357, 137/312, 137/625.64, 625.61

(56) References Cited

U.S. PATENT DOCUMENTS

| | | | | |
|---|---|---|---|---|
| 3,673,799 A | * | 7/1972 | Audiffred et al. ............. | 60/360 |
| 3,710,651 A | | 1/1973 | Marumo ....................... | 74/864 |
| 3,738,193 A | | 6/1973 | Sumiyoshi ................... | 74/731 |
| 3,748,856 A | * | 7/1973 | Uozumi et al. ............... | 60/357 |
| 3,839,864 A | * | 10/1974 | Ahlen .......................... | 60/364 |
| 3,977,502 A | * | 8/1976 | Chana .......................... | 60/359 |
| 4,209,985 A | * | 7/1980 | Master ......................... | 60/337 |
| 4,713,989 A | | 12/1987 | Hayakawa et al. ........... | 74/869 |
| 4,725,951 A | | 2/1988 | Niikura ....................... | 364/424.1 |
| 4,967,356 A | | 10/1990 | Mori ........................... | 364/424.1 |
| 5,090,528 A | | 2/1992 | Massel ........................ | 192/3.34 |
| 5,111,719 A | | 5/1992 | Okahara ...................... | 74/867 |
| 5,115,696 A | | 5/1992 | Takada et al. ................ | 74/869 |
| 5,253,550 A | | 10/1993 | Sonoda ........................ | 74/868 |
| 5,319,949 A | * | 6/1994 | Long et al. ................... | 60/360 |
| 5,323,320 A | | 6/1994 | Hathaway ................... | 364/424.1 |
| 5,368,531 A | | 11/1994 | Ando et al. .................. | 477/155 |
| 5,378,211 A | | 1/1995 | Slicker ........................ | 477/175 |
| 5,407,401 A | | 4/1995 | Bullmer ....................... | 477/110 |
| 5,472,389 A | | 12/1995 | Ando et al. .................. | 477/130 |
| 5,484,354 A | | 1/1996 | Vukovich .................... | 477/174 |
| 5,498,217 A | | 3/1996 | Maruyama ................... | 477/169 |
| 5,562,571 A | * | 10/1996 | Maruyama et al. .......... | 477/174 |
| 5,586,953 A | | 12/1996 | Abo ............................. | 477/47 |
| 5,611,371 A | * | 3/1997 | Wirtz .......................... | 137/625.64 |
| 5,653,660 A | | 8/1997 | Tsukamoto et al. .......... | 477/143 |
| 5,653,661 A | | 8/1997 | Kato et al. ................... | 477/176 |
| 5,719,768 A | | 2/1998 | Tashiro et al. ............... | 364/424.096 |
| 5,787,379 A | | 7/1998 | Ochiai ......................... | 701/68 |
| 5,801,497 A | | 9/1998 | Shamoto ...................... | 318/139 |
| 5,813,505 A | | 9/1998 | Olsen et al. .................. | 192/328 |
| 5,841,923 A | | 11/1998 | Kyoya ......................... | 385/93 |
| 5,853,349 A | | 12/1998 | Shimada ...................... | 477/143 |

(List continued on next page.)

Primary Examiner—Edward K. Look
Assistant Examiner—Igor Kershteyn
(74) Attorney, Agent, or Firm—Alfred M. Walker (57) ABSTRACT

A variable stall speed control (VSC) device for use with a non-lockup torque converter of an automatic transmission of an engine for improving the stall speed property of a mechanical power transmission torque converter. The VSC device hydraulically alters and varies the preset RPM stall range of a torque converter associated with an automatic transmission of an engine while maintaining or improving its coupling efficiency. This is accomplished by activating the VSC system which closes the fluid circuit to the converter to relieve the internal converter fluid pressure in order to allow the existing pressure in the converter to cause a discharge of a portion of its fluid. This reduces the amount of fluid and pressure in the torque converter allowing the impeller to rotate faster with the same amount of engine input torque. This results in an immediate increase in the stall (slip) speed of the torque converter. The VSC system is deactivated when the desired stall speed of the converter is reached.

7 Claims, 5 Drawing Sheets

U.S. PATENT DOCUMENTS

| | | | |
|---|---|---|---|
| 5,924,539 A | * 7/1999 | Braun et al. | 91/469 |
| 5,954,618 A | 9/1999 | Mikami | 477/174 |
| 5,976,054 A | 11/1999 | Yasuoka | 477/48 |
| 5,976,055 A | 11/1999 | Sasaki | 477/64 |
| 5,989,156 A | 11/1999 | Matsubara | 477/169 |
| 6,039,675 A | 3/2000 | Adachi | 477/174 |
| 6,086,513 A | 7/2000 | Tominaga | 477/169 |
| 6,090,011 A | 7/2000 | Minowa et al. | 477/107 |
| 6,099,436 A | 8/2000 | Kon | 477/64 |
| 6,357,229 B1 | * 3/2002 | Schust et al. | 60/357 |

* cited by examiner

VARIABLE STALL CONTROL

RELATED APPLICATIONS

This application is based upon provisional application serial No. 60/196,129, filed Apr. 11, 2000, which application is incorporated by reference herein.

FIELD OF THE INVENTION

The present invention relates to a system which hydraulically alters and varies the preset revolutions per minute (RPM) stall range of a torque converter associated with an automatic transmission of an engine while maintaining or improving its coupling efficiency.

BACKGROUND OF THE INVENTION

The torque converter is used in all automobiles that have an automatic transmission. It is physically connected to an engine's crankshaft on one side, and both mechanically and hydraulically to the transmission on the other. The basic function of the torque converter is to effectively couple the engine's power to the transmission and remaining drive train during each phase of a vehicle's operation and movement. It serves two primary functions: It acts as a fluid coupling that smoothly transfers engine torque to the transmission, and it also multiplies this torque when additional performance is desirable. To make the converter an efficient driveline component, Its size and configuration must be determined to meet the requirements of each automotive application.

During operation it must first permit a certain amount of slippage (stall speed) in order to assist engine in getting into its power (torque) range. This will allow for smooth engine operation each time the vehicle starts from rest and begins to accelerate. All torque converters are manufactured with a preset RPM stall (slip) range. The proper stall setting is predetermined by a number of automotive application factors. These include the following: A) How the vehicle is used and how much it weighs, B) The amount of torque the engine produces and it's RPM torque (power) curve, and C) The vehicle's rear axle ratio and tire size. Changes to any of these factors will likewise affect the operation of the torque converter, and hence on the performance of the vehicle. When any of these factors are permanently changed the torque converter must be mechanically reworked to achieve the desired RPM stall speed, particularly in high performance vehicles.

Once a vehicle is in motion the initial slippage (stall speed) is nearly eliminated through the inherent fluid dynamics of the torque converter. The engine and transmission are considered to be "fluid coupled" at that point. Any remaining slippage is viewed as the torque converter's coupling inefficiency. This is typical for any type of "non-lockup" type converter.

When a torque converter slips during any phase of vehicle operation, the engine's energy used to cause the slippage is converted to heat. This heat is transferred to the transmission fluid and subsequently to the transmission itself.

Converter Assembly

The torque converter is designed with three basic circular components: 1) the impeller or pump (driving component), 2) the turbine (driven or output component), and 3) the stator (reaction component). The stator allows the converter to multiply torque. Without this component the converter would be just a fluid coupling. It would only be capable of transferring an engine's torque and not multiply it.

These components are assembled in a specific position relative to each other and enclosed in a fluid filled circular steel housing. The impeller is secured to the "transmission side" of the converter housing. The turbine is located opposite the impeller and can rotate freely before being splined to the input shaft of the transmission. The stator is positioned between each of these components. It is mounted on a one-way roller clutch that is splined to the stationary stator support that projects from the front of the transmission. Each of these components incorporates a series of radial fins or blades that permit continuous fluid flow between them. One side of the converter housing is bolted to the flex plate that rotates with the crankshaft of the engine. The other side has an open hub that is indexed into the front pump of the transmission.

Normal Torque Converter Operation

Whenever an engine is run, the converter housing rotates and spins the front pump of the transmission. This action causes the entire transmission hydraulic system to become pressurized. This includes keeping the torque converter full and pressurized (50 to 80 psi). The transmission hydraulic system also provides a continuous flow of fluid in and out of the converter, and directs the existing heated fluid to the transmission oil cooler. However, this fluid transfer and flow do not provide the necessary force to turn the transmission's input shaft. The fluid flow through the action of the converter's three main internal components provides the torque transfer through the converter. This fluid movement is known as "rotary flow" and "vortex flow".

Since these components form a closed unit, the fluid flow is a varying but continuous process. Rotary flow describes the fluid movement in the direction of the converter rotation around the centerline of the transmission input shaft. When the impeller and turbine components are rotating at nearly the same speed the fluid movement is considered to be at nearly 100% rotary flow and the converter at its maximum "coupling phase". Conversely, when the fluid is circulating through all three components in a spiral path and there's great difference in rotational speed between the impeller and turbine, the fluid movement is considered to be nearly all vortex flow and the converter is at or near it's "stall phase". This flow causes the engine's input torque to become multiplied.

Acting as a centrifugal oil pump, the impeller component initiates and maintains fluid flow as it rotates. The fluid is pumped from the impeller into the turbine. It travels in a circular motion in the direction of engine rotation. As the high velocity oil flow strikes the turbine, it's force tries to make it rotate in the same direction. When an engine is idling, the force of this oil flow is not great enough to turn the turbine. If it were, the engine would stall with the vehicle stopped in gear. As the engine speed is increased from idle, the impeller speed also increases. Subsequently, the fluid flow and force to the turbine are also increased. This allows the turbine to transmit greater engine torque to the transmission. When the oil leaves the turbine it flows through the stator component. The stator redirects and accelerates the oil back into the impeller. This action increases both the velocity and force of the oil against the turbine fins, thereby multiplying (converting) the torque of the engine.

When a vehicle is standing still, with the transmission in gear, and the brakes applied, the torque converter is capable of multiplying engine torque by two-to-one or more when the engine's throttle is applied. This is considered the "turbine stall", or more commonly known as "converter stall". The maximum engine speed at which the turbine can be held stationary is known as the "rated stall RPM". The stator component is designed in such a way that it redirects the flow of oil back to the impeller in different ways depending on the speed and direction of the oil after it leaves the turbine. When the turbine is stalled, the oil leaves at a high angle striking the broad portion of the stator's blades. This locks the one way roller clutch in the stator and prevents it from rotating. This causes an increase in the force and velocity of the oil (vortex flow) as it approaches the impeller. When the vehicle and turbine speed increases, the centrifugal force of the oil leaving the turbine also increases until it approaches the speed of the impeller. This also causes a change in the direction of oil flow leaving the turbine, so that it now strikes the back of the stator's blades. As this occurs, the roller clutch automatically releases and the stator is able to freewheel. At this point (the converter's coupling phase), the stator will rotate in conjunction with the speed of the impeller, turbine and oil (rotary flow). When all the torque converter's components (including the fluid) rotate as a single unit, the torque multiplication is diminished and the converter acts as a fluid coupling.

Torque Converter Efficiency

The stator is the key component that permits the torque converter to multiply an engine's torque, rather than merely transmitting this torque. Stator blade angles are carefully chosen for specific vehicle applications and engine configurations. This is done in attempt to maximize the effective torque multiplication without sacrificing coupling efficiency. However, even at best a given stator blade angle is a compromise. All other things being equal, the blade angle that delivers high torque multiplication and high stall speed also permits higher slippage during the converter's coupling phase. Conversely, the blade angle that is selected for its coupling efficiency will not deliver sufficient converter stall when trying to effectively move a vehicle from a standstill.

Many attempts have been made over the years to improve this dual functionality of the torque converter. Besides improving the stator blade angle, a variable-pitch stator was developed many years ago. This permitted a high blade angle for good torque multiplication and a low angle for earlier converter coupling. Unfortunately, due to high manufacturing costs it was discontinued. The most recent attempt to make any improvement has come in the development of the "lock up" type converter. This converter has been used in many different automotive applications. Its purpose is not only to eliminate slippage and reduce heat, but to improve fuel economy as well. The "lock up" is normally engaged during the "coupling phase" after the vehicle has achieved a constant rate of speed. It accomplishes this by utilizing either a clutch built into the torque converter or a secondary input shaft from the transmission. However, this feature is not designed to have any direct effect on the initial slippage (stall speed). That is achieved by again using a stator that delivers high torque multiplication and relying on the lock up to improve the coupling efficiency.

One of the easiest ways to alter the converter's stall speed is to simply change its size. For a given vehicle combination as the torque converter's diameter is decreased, the stall will increase. The principle behind this has to do with transmitted torque. The larger converters flow more fluid because the centrifugal force causes the fluid speed to increase geometrically in relation to the distance to its center line of rotation. Since the fluid velocity is higher, the force it transmits to the turbine is higher resulting in higher torque. It takes less impeller-versus-turbine rotation (slip) for a large converter to produce the same output torque as a small converter. The turbine is able to reach the impeller speed quicker and therefore the coupling phase occurs sooner. So, as the diameter of a converter is reduced, it requires more impeller-versus-turbine rotation (slip) to rotate the turbine a given amount. As a result, a smaller torque converter will permit an engine to spin higher during all phases of operation, especially at low turbine speeds.

The last area where any mechanical modifications can be made to alter a converter's stall speed is by changing the impeller and turbine fin angles. The possibilities include changing the impeller fluid entrance or exit fin angles, or by changing the turbine fluid exit fin angle and machining the turbine fins. Of these, changing the impeller exit fin angle is the most common. Bending these fins back, opposite engine rotation reduces fluid velocity and raises the stall speed. Conversely, bending these fins toward the engine's rotation makes the impeller a more efficient pump. The fluid velocity will be increased and deliver more torque at a lower engine rpm, lowering the converters stall speed. The problem with making these types of modifications is that they affect both the torque multiplication and coupling phases. The stall raising modification will also permit more converter slippage during the coupling phase. The improved coupling efficiency modification will reduce the stall and multiplication phase and may cause the engine to lug at lower speeds.

Variable Stall Control-Theory

A variety of changes have been made in attempts to improve a torque converter's efficiency during each phase of its operation. they all involve making modifications to any one or all of mechanical components used when building a torque converter. Unfortunately, all the converter designs are full of compromises. Each modification attempts to alter the velocity and direction of the main motive force in the converter, namely the fluid.

In contrast to existing technologies, the "Variable Stall Control" (VSC) system of the present invention uses a more direct approach to improving the overall efficiency of the torque converter. It accomplishes this by using the transmission's hydraulic system. The VSC system momentarily displaces the initial charge of fluid to the converter and relieves its internal fluid pressure. This effectively alters both the preset operating stall range and the coupling speed and efficiency of the torque converter. Using the VSC system permits the torque converter components to be designed to maximize coupling efficiency, and yet maintain a desired stall range for any desired vehicle application. In doing so, many of the compromises built into the torque converter can be eliminated, and the overall efficiency is significantly improved.

Objects Of The Invention

It is therefore an object of the present invention to hydraulically alter and vary the present RPM stall range of a torque converter while maintaining its coupling efficiency.

It is also an object of the present invention to increase torque converter stall speed while its internal oil volume is reduced.

It is therefore also an object of the present invention to rapidly re-engage the torque converter at will when appropriate under the circumstances.

It is yet another object of the present invention to rotate the impeller at an increased speed with the same amount of engine input torque.

It is further an object of the present invention to multiply torque of a torque converter.

It is yet another object of the present invention to reduce the amount of slippage and heat generated during a torque converter's coupling phase.

It is also an object of the present invention to improve over the disadvantages of the prior art.

SUMMARY OF THE INVENTION
Operation Of The Variable Stall Control

In keeping with these objects and others which may become apparent, the present invention takes into consideration the fact that under normal operation, as soon as the torque converter is rotated by the engine, the front pump of the transmission pressurizes the entire hydraulic system that includes the torque converter. The transmission fluid is automatically drawn from the oil pan and through the transmission's valve body by the front pump. It is then forced through the stator support and into the torque converter. The pressure in the converter forces the exiting fluid into the cooling system and back to the transmission. This closed fluid circulation continues as long as the engine is running.

The Variable Stall Control system of the present invention is introduced into the torque converter's lubrication line. It is set up to operate at the point the fluid reaches the valve body. When the VSC system is activated, the fluid circuit to the converter is closed, and simultaneously another fluid passage is opened to immediately relieve the internal converter fluid pressure. This action also allows the existing pressure in the converter to cause a discharge of a portion of its fluid. The fluid pressure to the cooling circuit also drops to near zero. Simply closing or restricting the fluid circuit to the torque converter (i.e. altering the fluid pressure) will not permit a discharge of fluid. Fluid discharge must occur rapidly in order to have the desired effect.

When the normal fluid circuit to the torque converter is interrupted in this way, a number of things happen which affect the converter's stall phase. Since there is less fluid and pressure in the converter, the impeller component is now able to rotate faster with the same amount of engine input torque. Subsequently, the remaining fluid also travels faster from the impeller to the turbine. Since there is less fluid volume, it can not apply the same force required to spin the turbine as it could under normal operating conditions. This results in an immediate increase in the stall (slip) speed of the torque converter. The amount of engine torque at a specific rpm governs the amount of stall speed increase for as long as the VSC system remains active.

When the desired stall speed of the converter is reached, the VSC system is deactivated. At this point, the fluid circuit to the converter is reopened, and simultaneously the fluid relief passage is closed to immediately restore the internal fluid pressure and flow. The fluid then has sufficient force and velocity to cause the turbine to rotate. Since the fluid in the converter was already traveling at a faster velocity before deactivating the VSC system, (intensifying the function of the stator component) the recharged converter provides additional torque multiplication.

Advantages Of Variable Stall Control

The Variable Stall Control (VSC) system of the present invention has been developed to provide increased converter stall speed and torque multiplication. When this system is used in conjunction with a torque converter that is designed to provide maximum coupling efficiency, it is able to achieve its coupled phase sooner, thus reducing the amount of slippage and heat generated during both a torque converter's stall and coupling phase.

This is of particular importance in high performance vehicles. In many such applications a "transmission brake" feature is used. When "transmission brake" is applied, the input shaft of the transmission is held stationary. This restricts the rotation of the turbine component in the converter during the stall phase. When the turbine is held stationary, the fluid temperature and internal pressure inside the torque converter normally increases dramatically. This is caused by the turbulence and friction of the high velocity fluid trying to impart its force onto the turbine and stator components. Because the Variable Stall Control (VSC) system reduces the fluid volume and relieves converter pressure simultaneously during the stall phase, this turbulence and friction is also momentarily reduced.

BRIEF DESCRIPTION OF THE DRAWINGS

The present invention can best be understood in connection with the accompanying drawings, in which.

DESCRIPTION OF THE PREFERRED EMBODIMENT

Figure 1:
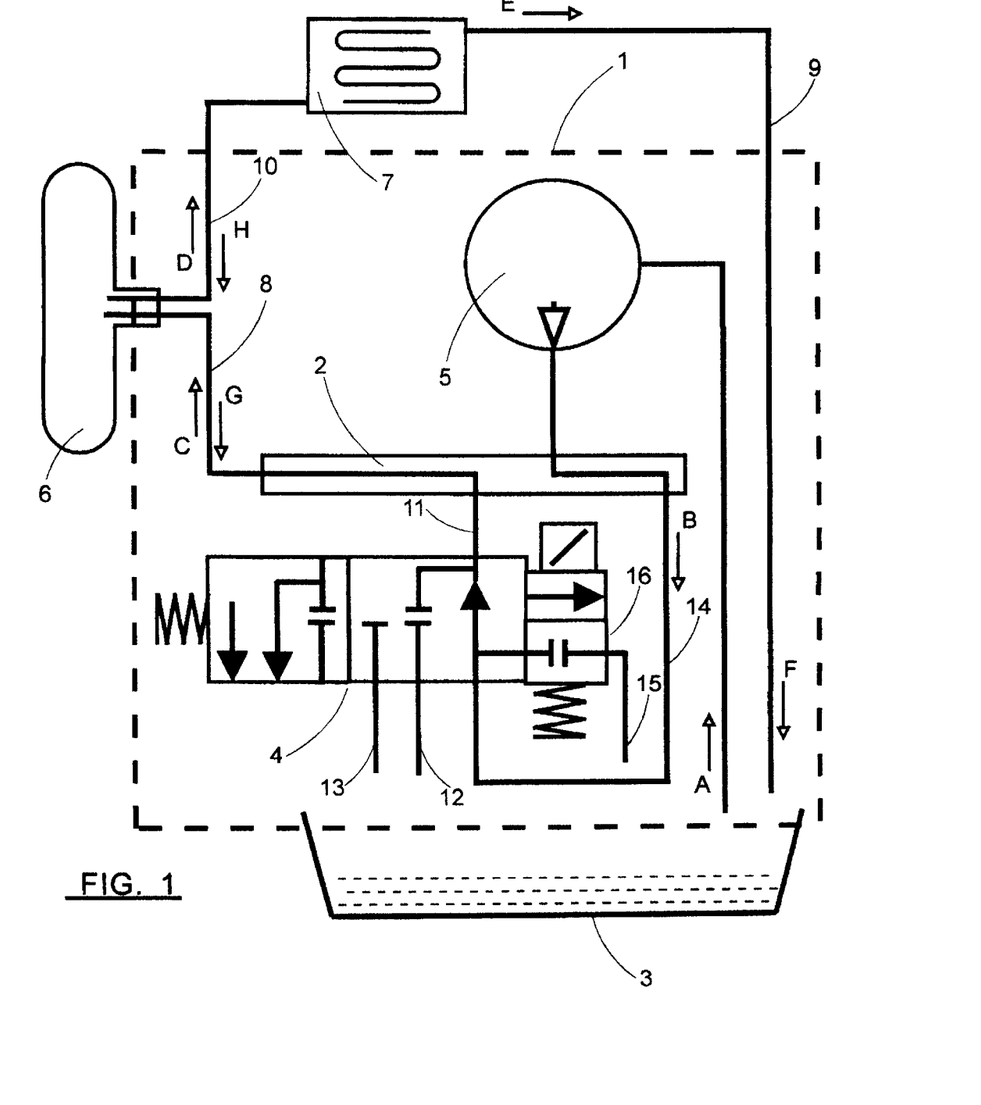
FIG. 1 is a schematic fluid flow diagram showing alternate fluid flows for an automatic transmission and non-lock-up torque converter under normal operation and for an automatic transmission and non-lockup torque converter operating when the variable Stall Control of the present invention is activated.

FIG. 1 shows both a typical fluid flow schematic diagram for an automatic transmission under normal operation, as well as the fluid flow schematic diagram for an automatic transmission under the influence of an activated VSC unit 4. This also shows the typical position of the Variable Stall Control ("VSC") unit 4. The front pump 5 is supported by the transmission case 1. As the torque converter 6 is rotated by the engine, the front pump 5 siphons the transmission fluid from the fluid reservoir in the pan 3, in the direction of arrow A, and pressurizes the entire transmission's hydraulic system. In the converter 6 and cooling line circuit the fluid first passes through the transmission's valve body 2 and the deactivated VSC unit 4 in the direction of arrow B, and then back to the transmission's valve body 2 (along fluid path 11). It then passes through the valve body 2, in the direction of arrow C, (along fluid path 8) into the torque converter 6. It is then discharged from the torque converter 6 in the direction of arrow D, and exits the transmission case 1 (along fluid path 10) where it travels through the fluid cooler 7. The fluid then returns along fluid path 9 in the direction of arrow E, through the transmission case 1 and into the fluid pan 3 in the direction of arrow F. The fluid is continuously circulated in this manner as long as the rotation of the front pump 5 is maintained.

FIG. 1 also shows the fluid flow for an automatic transmission under the influence of an activated VSC unit 4. At the moment the VSC 4 is electrically activated the fluid feed to the torque converter 6 via the valve body 2 is shut off and a fluid discharge port inside the VSC unit 4 is opened. The fluid in the torque converter 6 is now able to discharge back through fluid path 8 in the direction of arrow G, and fluid path 10 acts as a vent in the direction of arrow H. At the same time that fluid discharges, the stall rpm speed (or slip function) of the torque converter 6 dramatically changes. When the desired increased stall rpm is reached, the VSC unit 4 is electrically deactivated and fluid flow in the transmission and torque converter returns to normal operation.

Figure 2:
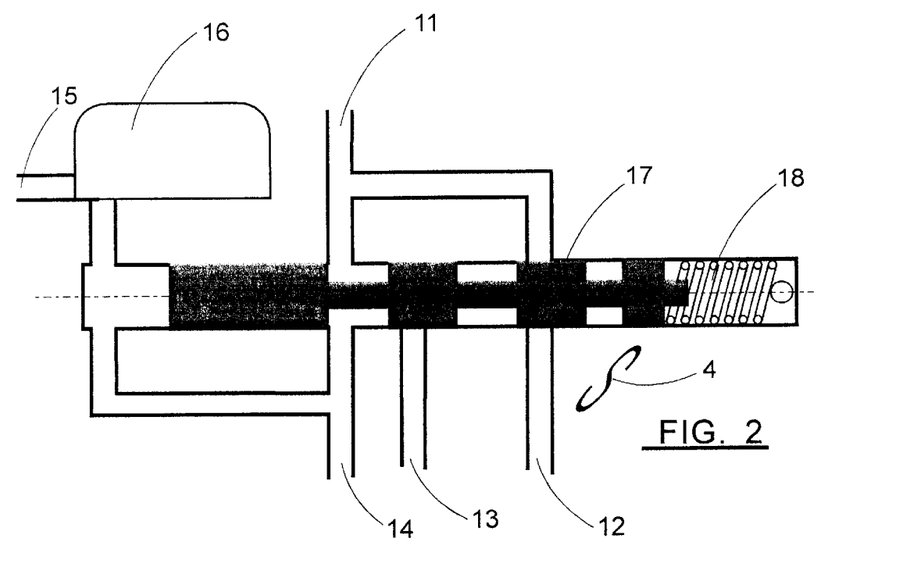
FIG. 2 is a schematic diagram of the variable Stall Control unit when it is deactivated.

The schematic diagram in FIG. 2 illustrates the Variable Stall Control (VSC) unit 4 deactivated. The electrical solenoid valve 16 is not energized. The fluid circuit 14 is introduced into the torque converter lubrication line from the transmission's valve body 2. Under normal operation the fluid pressure enters fluid circuit 14 and causes the VSC control valve member 17 to move and compress the VSC return spring 18. As long as the transmission's hydraulic system is pressurized, the control valve member 17 reaches a maintained normal operating position relative to all of the fluid circuits in the VSC unit. When this position is reached, the fluid entering circuit 14 from the valve body also travels into fluid circuit 11 and maintains fluid pressure to the torque converter 6. Fluid circuits 12, 13 and 15 are all closed under normal operating conditions.

Figure 3:
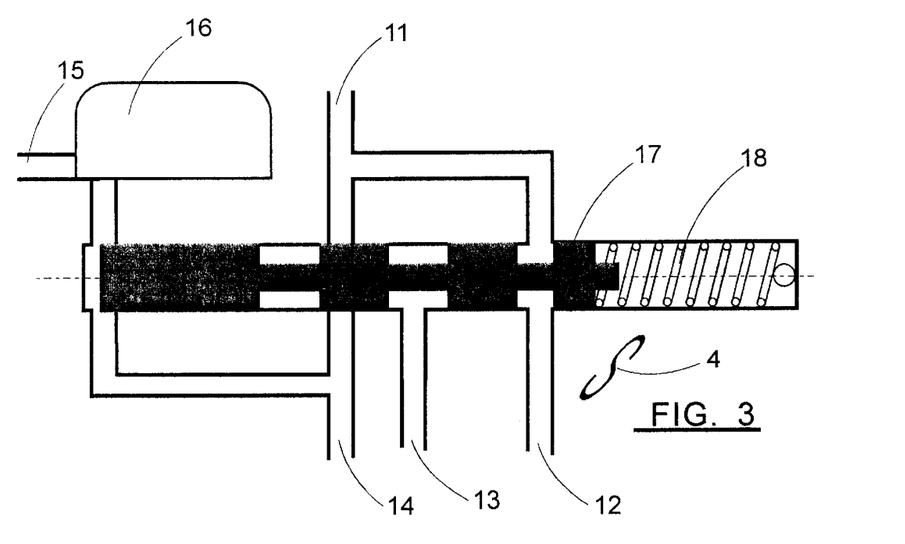
FIG. 3 is a schematic diagram of the Variable Stall Control unit when it is activated.

The schematic diagram in FIG. 3 illustrates the Variable Stall Control (VSC) unit 4 activated. The electrical solenoid valve 16 is energized and its valve opens fluid circuit 15. When this occurs, the pressurized fluid entering from circuit 14, is vented by the opened fluid circuit 15. This fluid pressure drop permits the VSC return spring 18 to force the VSC control valve member 17 into an active maintained position. As long as the solenoid valve 16 is energized, the VSC control valve member 17 remains in the active position. In this position, pressurized fluid to circuit 11 feeding the torque converter is shut off. Simultaneously, fluid circuits 12 and 13 open. Opening fluid circuit 12 permits an immediate direct discharge of torque converter fluid from fluid circuit 11. Opening fluid circuit 13 immediately relieves any internal fluid pressure in the VSC unit 4. Since the VSC unit is located inside the fluid pan (See FIG. 1, showing fluid pan 3, and Variable Stall Control unit 4), all of the vented fluid from circuits 12, 13 and 15 discharges directly into fluid reservoir 3 for as long as the VSC unit 4 remains activated.

Figure 4:
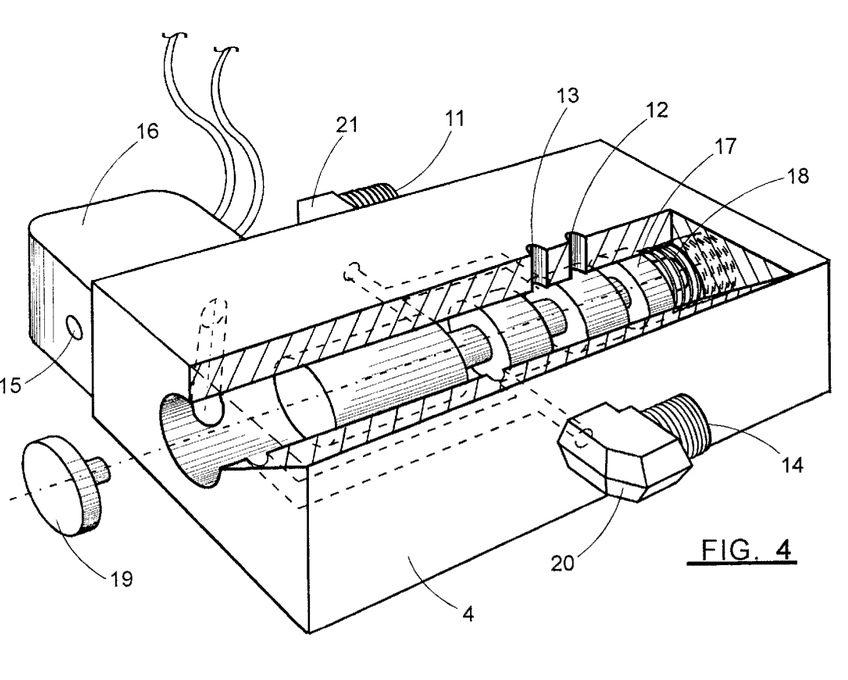
FIG. 4 is a perspective view of the assembled Variable Stall Control unit.

The perspective drawing in FIG. 4 illustrates an assembled Variable Stall Control (VSC) unit 4. The metal unit housing of Variable Stall Control unit 4 is precision machined to incorporate all of the internal fluid circuits 11, 12, 13, and 14. The housing of Variable Stall Control unit 4 is precision machined to permit rapid movement of the VSC control valve member 17 and return spring 18. The solenoid control valve 16 is secured and sealed to the surface of the housing of Variable Stall Control unit 4. The plug 19, preferably metal, is pressed into the housing of Variable Stall Control unit 4 to hydraulically seal the unit. The external fittings 20 and 21 are threaded into the housing of Variable Stall Control unit 4 and provide the means of plumbing the Variable Stall Control unit 4 into the transmission's hydraulic system. Fitting 20 connects fluid circuit 14 of the VSC unit 4 for the incoming fluid from the transmission's valve body. Fitting 21 connects fluid circuit 11 of the VSC unit 4 back to the valve body and lubrication line of torque converter 6.

Figure 5:
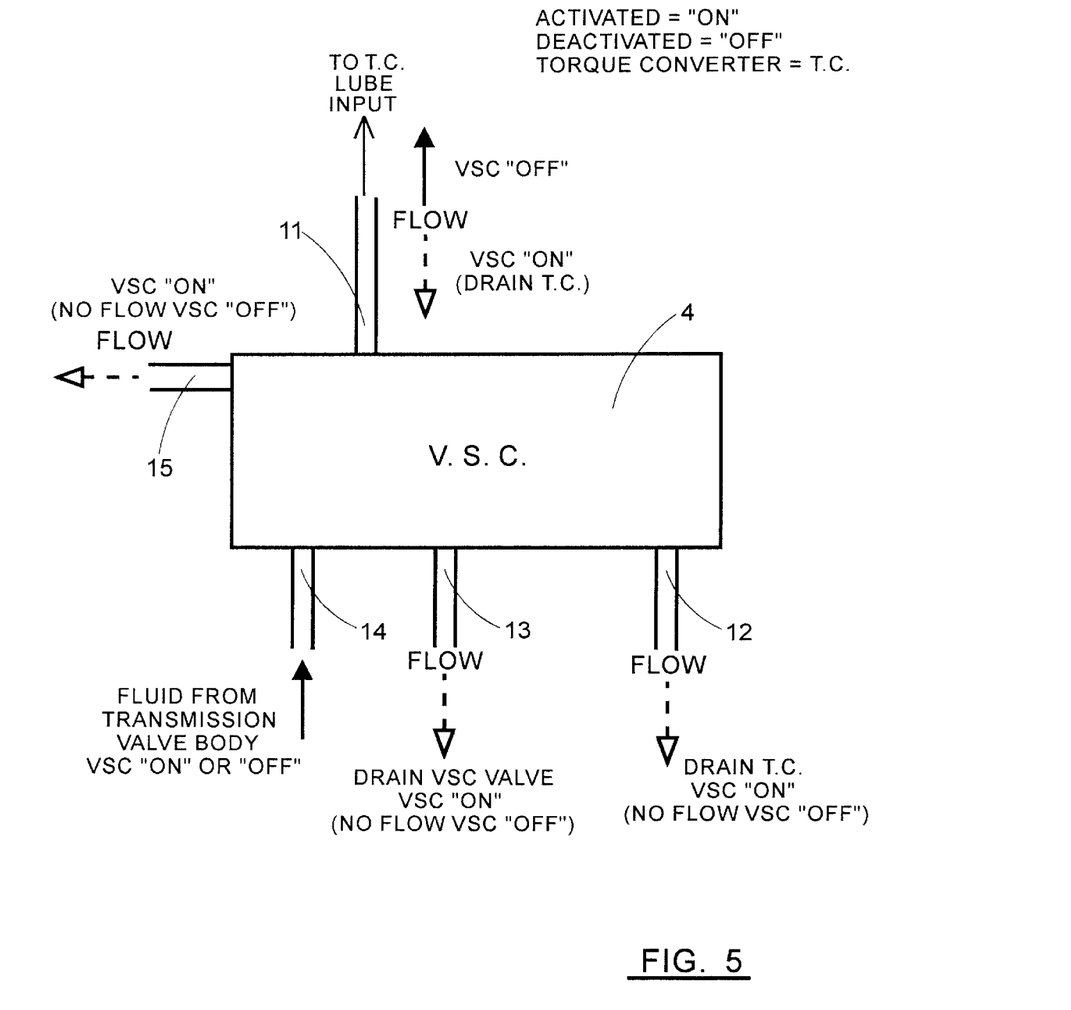
FIG. 5 is a fluid flow diagram of the Variable Stall Control unit when both activated and deactivated; and, FIG. 6 shows prior art recorded data log results, and, FIG. 7 shows recorded data log results illustrating an actual Variable Stall Control performance of the present invention.

To summarize the operation of VSC unit 4, FIG. 5 shows the fluid flow in diagram form with the VSC unit 4 activated (ON) and deactivated (OFF). With VSC unit 4 deactivated, pressurized fluid enters conduit 14 and is routed within VSC unit 4 to outlet conduit 11 which connects to the valve body 2 and lubrication line of the torque converter 6 (See FIG. 1). Outlets 12, 13, and 15, which empty into the fluid pan 3, (See FIG. 1) are closed (no flow) in the inactive state of VSC unit 4. When the VSC unit 4 is activated (ON), fluid flow entering at conduit 14 is re-routed to drain at orifice 15, within the VSC unit 4, while flow in conduit 11 actually reverses to provide a drain path for a small volume of fluid to drain from torque converter 6 into pan 3 (as shown in FIG. 1) via orifice 12 along an internal path formed within VSC unit 4. This action is mediated by a vent path formed through oil cooler 7 (as shown in FIG. 1). Therefore, while VSC unit 4 is ON, torque converter 6 is depressurized, while its internal oil volume is reduced somewhat, thereby permitting significantly higher converter stall speed. In this mode, orifice 13 is opened to drain a small chamber within VSC 4, thereby preventing any adverse pressure build-up at control valve member 17 (as shown in FIG. 3.)

Performance tests in an actual automotive application with an eight-cylinder engine coupled to a non-lockup torque converter and automatic transmission equipped with a VSC were conducted. The automobile's drive-line was also equipped with a data logger which provides graphs of FIG. 6. and FIG. 7.

Figure 6:
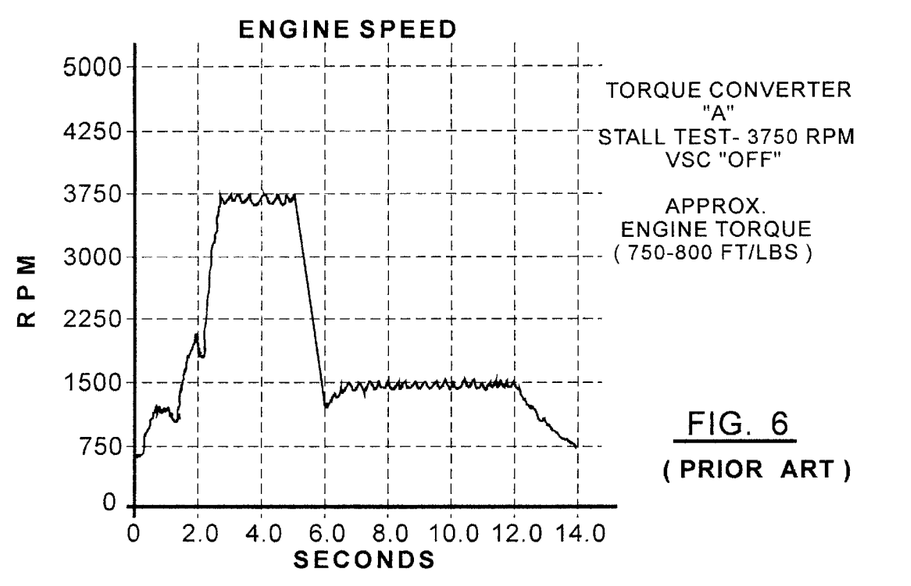

FIG. 6 shows a prior art performance run plotting engine rotational speed (RPM) versus time (seconds) with the VSC unit 4 being deactivated—designated as OFF. The maximum converter stall speed recorded was 3750 RPM.

Figure 7:
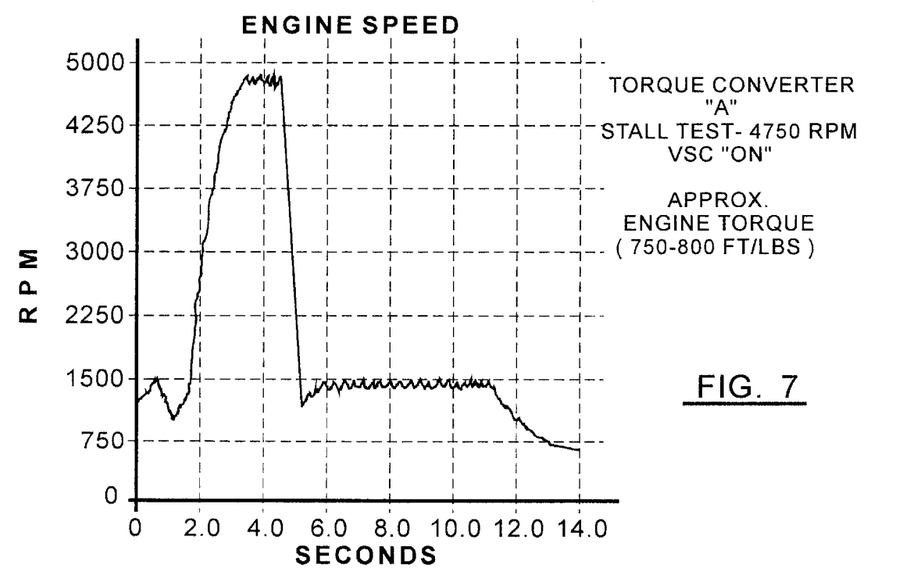

An identical test run with the VSC unit 4 being activated—designated as ON, is shown as the performance plot of FIG. 7. The torque converter's stall speed has increased substantially to 4750 RPM. This shows the effectiveness of the VSC assembly in achieving its intended result.

It is further noted that other modifications may be made to the present invention, without departing from the scope of the invention, as noted in the appended claims.

I claim:

1. A variable stall speed control for use with an automatic transmission having a non-lockup torque converter for improving stall speed and coupling efficiency properties of said torque converter, comprising:

the automatic transmission having said non-lockup torque converter;

a front pump for delivering transmission fluid under pressure to said torque converter to pressurize said transmission and said torque converter, said transmission fluid exiting from said torque converter being forced through a cooling system into said fluid reservoir;

means for connecting a suction side of said front pump to said transmission fluid within said reservoir;

a variable stall control unit positioned so that said transmission fluid from said front pump passes through said variable stall control unit on the way to said torque converter;

means for activation of said variable stall control unit to vent said transmission fluid within said torque converter to cause a rapid discharge of fluid from said torque converter into said fluid reservoir to cause an immediate increase in the stall speed of said torque converter; and said activation means upon deactivation causing said variable stall control unit to immediately restore internal fluid pressure and flow to said torque converter when a desired stall speed of said torque converter is reached.

2. The variable speed control of claim 1 in which said variable stall control unit comprises a valve body cylindrical in shape closed at both ends with a sliding valve member within said valve body, a spring at a distal end of said valve body biasing said valve member toward a proximate end of said valve body, fluid pressure within said transmission forcing said valve member to move toward said distal end to a first position compressing said spring during normal direction of flow of said fluid, said activation means upon activating relieving fluid pressure on said valve member allowing said spring to move said valve member into a second position closer to said proximate end of said valve body venting fluid pressure within said torque converter.

3. The variable speed control of claim 2 in which a chamber is formed between said piston member and a wall of said valve body at the proximate end of said valve body, said chamber being in communication with a source of pressure from said front pump to maintain said piston member in the first position biased against said spring during normal flow of fluid through said stall control unit.

4. The variable speed control of claim 3 in which said activation means upon being activated opens said chamber to said fluid reservoir for relieving pressure within said chamber allowing said spring to move said valve member into the second position nearer the proximate end of said valve body reducing the volume of said chamber.

5. The variable speed control of claim 4 in which said valve body has a plurality of ports for ingress and egress of fluid through said stall control unit during flow of fluid through said stall control unit.

6. The variable speed control of claim 5 in which said valve member has a plurality of control grooves communicating with some of said ports for allowing normal flow of fluid through said valve body when said valve member is in the first position compressing said spring and for communicating with other of said ports allowing fluid to vent in an opposite direction through said valve body when said valve member is in the second position.

7. The variable speed control of claim 6 in which said activation means comprises a solenoid operated valve which is closed during normal flow of fluid through said stall control unit.

* * * * *